US012318709B2

(12) United States Patent
Ladislaus et al.

(10) Patent No.: US 12,318,709 B2
(45) Date of Patent: Jun. 3, 2025

(54) PROCESS FOR THE CONTINUOUS PRODUCTION OF SUB-MICRON TWO-DIMENSIONAL MATERIALS SUCH AS GRAPHENE

(71) Applicant: BLACK SWAN GRAPHENE INC., Toronto (CA)

(72) Inventors: Paul Ladislaus, Sedgefield (GB); Lee Glasgow, Consett (GB)

(73) Assignee: BLACK SWAN GRAPHENE INC., Toronto (CA)

( * ) Notice: Subject to any disclaimer, the term of this patent is extended or adjusted under 35 U.S.C. 154(b) by 771 days.

(21) Appl. No.: 17/404,118

(22) Filed: Aug. 17, 2021

(65) Prior Publication Data

US 2022/0040600 A1 Feb. 10, 2022

Related U.S. Application Data

(63) Continuation of application No. 15/779,361, filed as application No. PCT/GB2016/053710 on Nov. 25, 2016, now Pat. No. 11,090,585.

(30) Foreign Application Priority Data

Nov. 27, 2015 (GB) ...................... 1521001

(51) Int. Cl.
*B01D 21/26* (2006.01)
*B04B 7/14* (2006.01)
*B04B 11/02* (2006.01)
*C01B 19/04* (2006.01)
*C01B 32/194* (2017.01)
(Continued)

(52) U.S. Cl.
CPC .............. *B01D 21/262* (2013.01); *B04B 7/14* (2013.01); *B04B 11/02* (2013.01); *C01B 19/04* (2013.01); *C01B 32/194* (2017.08); *C01B 32/196* (2017.08); *C01B 32/215* (2017.08); *C01G 39/06* (2013.01); *C01G 41/00* (2013.01); *C02F 1/385* (2013.01)

(58) Field of Classification Search
CPC ........ B01D 21/262; B01D 43/00; B04B 7/14; B04B 11/02; C01B 19/04; C01B 32/194; C01B 32/196; C01B 32/215; C01G 39/06; C01G 41/00; C02F 1/385
See application file for complete search history.

(56) References Cited

U.S. PATENT DOCUMENTS

| 4,861,329 | A | * | 8/1989 | Borgstrom | ................ B04B 7/14 |
|---|---|---|---|---|---|
| | | | | | 494/73 |
| 5,085,707 | A | * | 2/1992 | Bundy | ................... D21H 17/69 |
| | | | | | 106/486 |
| 2011/0226033 | A1 | * | 9/2011 | Rudman | .............. B21D 53/264 |
| | | | | | 72/379.2 |

FOREIGN PATENT DOCUMENTS

WO WO-2012033440 A2 * 3/2012 ............... B04B 1/08

* cited by examiner

*Primary Examiner* — Walter D. Griffin
*Assistant Examiner* — Shuyi S. Liu
(74) *Attorney, Agent, or Firm* — ROBIC (57) ABSTRACT

A system and a method of continuously separating submicron thickness laminar solid particles from a solid suspension, segregating the suspension into a submicron thickness particle fraction suspension and a residual particle fraction suspension, the method comprising the steps of; providing a continuous centrifuge apparatus; providing a suspension of submicron thickness laminar solid particles in a solid suspension; wherein the solid suspension comprises the submicron thickness solid particles in a liquid continuous phase; separating the solid suspension in the apparatus.

4 Claims, 7 Drawing Sheets

(51) Int. Cl.
  *C01B 32/196* (2017.01)
  *C01B 32/215* (2017.01)
  *C01G 39/06* (2006.01)
  *C01G 41/00* (2006.01)
  *C02F 1/38* (2023.01)

PROCESS FOR THE CONTINUOUS PRODUCTION OF SUB-MICRON TWO-DIMENSIONAL MATERIALS SUCH AS GRAPHENE

RELATED APPLICATIONS

This application is a continuation of a application having Ser. No. 15/779,361, filed 25 May 2018 (issued as U.S. Pat. No. 11,090,585 on 17 Aug. 2021), which is a 35 USC 371 National Stage Application of PCT Application Serial No. PCT/GB2016/053710, filed 25 Nov. 2016, which claims priority to GB Application Serial No. GB1521001.6, filed 27 Nov. 2015, the foregoing applications being incorporated by reference herein.

FUNDING STATEMENT

The project leading to this application has received funding from the European Union's Horizon 2020 research and innovation programme under grant agreement No 646155.

FIELD OF THE INVENTION

The invention relates to a process, preferably a continuous separation process, for producing dispersions of atomically thin 2-dimensional materials, preferably up to 100 nm in thickness most preferably in the range one atom thick up to 30 layers. In particular, the invention relates to a scalable continuous process for separating 2-dimensional materials by size, including by thickness, for example graphene, molybdenum disulphide or boron nitride, to assist industrial production.

BACKGROUND TO THE INVENTION

Graphene is a 2-dimensional allotrope of carbon, consisting of a few atoms thickness in a hexagonal structure. Graphite, a widely used mineral, is effectively a three-dimensional form of graphene, with multiple layers bound together by van der Waals forces. Graphene has attracted a lot of interest since it was first isolated in 2004. The novel mechanical, thermal and electrical properties of the material are anticipated to enable a number of uses, and there is a very active research community developing applications for graphene. Graphene has been produced on a laboratory scale sufficient for experimental analysis, but production in commercial quantities is still a developing area. Other single layered structures such as molybdenum disulphide or boron nitride are expected to exhibit similarly interesting properties in the nanotechnology field.

Min Yi and Zhigang Shen, (A review on mechanical exfoliation for the scalable production of graphene, Journal of Materials Chemistry, A, 2015, 3, 11700) provide an overview of the state of the art regarding graphene production.

Large-scale production of graphene at a low cost has been demonstrated to be possible using top-down techniques, whereby graphene is produced through the direct exfoliation of graphite in a liquid phase. The starting material for this is three-dimensional graphite, which is separated by mechanical and/or chemical means to produce graphene sheets a few atoms thick.

Prof. Jonathan Coleman's group at Trinity College Dublin developed a production route for graphene by sonication-assisted liquid-phase exfoliation of graphite in 2008. Starting with graphite powder dispersed in specific organic solvents, followed by sonication and centrifugation, they obtained a graphene dispersion. This method of producing graphene seemed relatively easy. The main shortcoming of this method is the extremely low graphene concentration (around 0.01 mg/mL), which is far from practical application.

More recently, fluid-dynamics based methods have emerged for graphite exfoliation. These are based on mixing graphite in a powder or flake form with a fluid to form a suspension. The fluid can then be subjected to turbulent or viscous forces which apply shear stress to the suspended particles. The shear stress exfoliates graphene platelets from the graphite, and these remain suspended in the fluid. Usually the fluid is either a solvent, or a surfactant mixture which must be removed from the finished product.

Removing the graphene platelets from the fluid is usually carried out by centrifuging the suspension in a desk top or laboratory centrifuge for 45 minutes or more. The larger particles form a sediment and the supernatant fluid is then further processed to extract the desired platelets from the liquid. In order to select graphene nano-platelets with only a few atomic layers thickness, the process typically needs to be repeated several times, US Patent application 20150283482 describes a method of sorting 2-dimensional materials by thickness using density gradient ultracentrifugation (DGU). In one example, molybdenum disulphide was ultracentrifuged at 32 krpm for 24 hours. During DGU, the differences in the buoyant density of the two-dimensional nanomaterials and that of the surrounding medium drive the two-dimensional nanomaterials to their respective isopycnic points, where the buoyant density of a particular nanomaterial crystallite matches that of the surrounding medium.

International Patent Application WO2014001519 provides a process for exfoliating a 3-dimensional layered material to produce a 2-dimensional material, including the step of centrifuging at 2000 rpm for 45 minutes.

In "Size selection of dispersed, exfoliated graphene flakes by controlled centrifugation", Umar Khan et al, June 2011 describe a process of centrifuging an exfoliated graphite suspension. Centrifugation at high rates results in small flakes being dispersed but larger ones sedimenting out. This sediment can be collected and redispersed. Centrifugation at a lower rate then results in a dispersion of slightly larger flakes and the rejection of the rest. Repeating this procedure, a number of times results in the separation of the original dispersion into a number of fractions each with different mean flake length, in this case from ~1 µm to ~3.5 µm.

Graphite, the multi-layered crystalline form of graphene has a density over twice that of water and will readily settle out of suspension. However, once a layer of graphene is coated with surfactant, the combination of a layer with the surfactant on each face reduces the density. For single layer graphene, the density is close to 1.1 g/cc, only 10% above that of water. For each additional graphene layer the density increases. Because nano-platelets coated with surfactant behave as a colloid, the particles can remain in suspension for days or weeks.

Centrifugation can be used to separate a fine suspended solid from a liquid. There are various types of centrifuge. A laboratory centrifuge is the obvious choice, as the centrifuge fluid properties can be carefully controlled and the time and rotational velocity of the centrifuge can be selected to obtain the desired degree of separation.

The speed of separation also depends on particle size, as drag force on each particle depends on particle size and the viscosity of the fluid they are suspended in. Under a constant accelerating force, each particle in suspension reaches a terminal velocity at which it migrates through the fluid.

Graphene produced by different initial processes will have different flake sizes and different distributions of flake thickness. Centrifugation can sort the graphene flakes into different thicknesses and/or different sizes of nano-platelets, but can take considerable time. In US patent application 20150283482 for example some of the centrifugation examples take 24 hours to complete, producing only a few ml of concentrated suspension and this needs to be repeated in many instances to obtain the final product.

After centrifugation, a filtration step is normally required to remove the selected nano-platelets from the suspension, and then further chemical washing is required to remove the surfactant and remaining fluids.

Whilst obtaining graphene from graphite has received particular attention, there are a number of other laminar materials which may be delaminated to provide nanoscale platelets. The underlying process is one of comminution of a particulate feedstock, typically a mineral ore, under a shear regime that gives rise to delamination. Three basic mechanisms occur under high shear. A relevant reference is Ozcan-Taskin, N. G et al, "Effect of particle type on the mechanisms of breakup of nanoscale particle clusters", Chem Eng Res Des (2009), 10, 1016.

The first mechanism is erosion of the particulate feedstock. The first mechanism is prevalent in rotor-stator devices, the well-known Silverson™ mixer being one type. This mechanism gives rise to a bimodal particle size distribution and has the advantage that processed product can be more readily separated into the usually desired nano platelets and the residual particulate feedstock due to the clear difference in physical properties between the particles. The second mechanism is shattering, in which the particulate feedstock is entirely broken up into a large number of very small particles. This is clearly the most efficient and beneficial mechanism as it leads directly to the desired product. However, this type of process is not currently available at a large scale suitable for industrial production.

The third mechanism, rupture, has hitherto not been readily available but is now becoming available by means of impingement under high pressure of feedstock particles against an impact head as disclosed in co-pending patent application GB1518105.0. Such apparatus is capable of operating at an industrial scale but the resulting product is a mixture of residual particulate feedstock, particles of an integral fraction of the feedstock size, such as a half, a quarter et cetera in the small portion of nanoscale particles.

There is an opportunity to realise industrial scale production of nanoscale particles if such products from an apparatus which uses the third mechanism can be effectively separated, since processes that can be carried out on the multiple kilogram scale, currently giving a low yield, will still give a higher output than gram-scale processes of higher efficiency. There is therefore a need to separate nanoscale particles from an otherwise broad particle size distribution. In particular, there is a need to separate nanoscale platelets from a mixture comprising a broad particle size distribution.

As mentioned, whilst obtaining graphene from graphite has received particular attention there are a number of other laminar materials. When investigating delamination mechanisms under shear it would appear that the third mechanism mentioned above can be prevalent with several of the materials even when using rotor-stator technology. There is therefore a particular need for an industrial scale, and preferably continuous, separation method and apparatus to obtain nanoscale laminar material from broad particle size distributions of such laminar materials. Relevant materials include the laminar forms of transition metal dichalcogenides; in this sense a chalcogenide being a sulphide, selenide or telluride of a transition metal such as tungsten or molybdenum. Also relevant are structurally similar materials such as boron nitride.

In addition, industrial scale processes and apparatus such as the one mentioned in GB1518105.0 are conveniently and sometimes necessarily carried out with large amounts of water or similar diluent as a transport medium. It would therefore be beneficial to have a separation mechanism so that a nanoscale platelet product could be available in more concentrated form. This is particularly relevant to nanoscale platelets as their rate of sedimentation, if at all, is low and filtration is not an effective mechanism for concentration.

A further requirement for effective industrial scale use is that any procedure should be relatively rapid. Similarly, a further requirement for effective industrial scale use is that the apparatus and procedure under which it operates should be capable of operating in continuous i.e. flow production mode rather than batch mode.

There exists therefore a need for a separation and/or concentration process that can selectively remove submicron to micron scale nano-platelets, such as atomically thin 2-dimensional materials preferably up to 100 nm in thickness, most preferably in the range one atom thick to 30 layers, such as graphene and other submicron to micron scale laminar particles from a suspension as part of an industrial scale production system.

The present invention seeks to overcome the problems in previous techniques by providing a separation method for graphene that is rapid, scalable to industrial quantities and energy efficient.

SUMMARY OF THE INVENTION

The present invention in its various aspects is as set out in the appended claims.

The preferred form of continuous centrifuge is a disc stack separator but a disc bowl centrifuge may also be used. The disc stack centrifuge is preferably a conical plate centrifuge. Of the types of such centrifuges a nozzle-type centrifuge is preferred as this gives the most efficient separation. The centrifuge is preferably operated in a continuous mode in which both fine and coarse fractions are continuously removed.

Preferred parameters of the preferred conical plate centrifuge (such as of the nozzle type) are:

A disc angle (relative to the axis of rotation) 30° to 50°, preferably 35° to 40°. The number of discs is not critical and may be in the range 10 to 100 discs. Disc separation is preferably from 1 mm to 20 mm, more preferably from 5 mm to 10 mm, as this optimises size and throughput whilst avoiding blockages for the feedstocks relevant to the present invention. A further parameter is the cone angle for discharge which is preferably in the same angular range as the disc angle above.

The rate of rotation of the discs in continuous operation is determined so as to provide centrifugal acceleration in the range between 2000 g and 25000 g, preferably between 4000 g and 18000 g between the inner and outer limits of the disc/cone. 'g' means acceleration in units of normal Earth gravity, or 9.8 ms$^{-2}$.

With a disc stack separator, unlike a conventional laboratory centrifuge, simply providing a higher G force does not ensure better or more efficient separation.

Counteracting the G force is a fluid flow velocity and this in the range between 0.1 m/s to 0.00001 m/s, preferably between 0.01 m/s to 0.0001 m/s between the inner and outer limits of the disc/cone.

The rotational speed of the disc stack separator can be selected to vary both the centrifugal force which differentially separates the mixture according to density, and also the turbulence present in different parts of the centrifuge which retains selected particles in suspension. The disc stack separator may be operable to rotate from 1000 RPM to 12000 RPM. Preferably the separator is configured to operate at between 9000 RPM and 9,600 RPM.

The effect of the rotation, in for example a disc stack with a radius of 15 cm is to produce an acceleration on particles at the outer edge of the disc of between about 145,000 N/Kg and 151,000 N/Kg or 15,000 g. The process is scalable by altering the rotational speed to produce the same acceleration using a different size of disc.

The rate of input feed in conjunction with the disc stack separator dimensions affects the radial velocity of the fluid between the plates. In this case, we have selected a feed rate that provides an optimal velocity of fluid. In particular, because the acceleration forces reduce as the suspension approaches the centre of the disc stack, while the radial velocity of the suspension increases, a balance can be obtained between the Stokes velocity of the particles in suspension and the movement of the continuous phase.

The radial velocity of the fluid at the outer edge of the rotating plates may be between 0.01 and 2 cm/s, preferably between 0.02 and 1 cm/s.

To give an indication of the industrial nature of this process an input feed of fluid suspension is typically between 50 litres per hour and 4000 litres per hour.

Due to the laminar nature of the nano-platelets a low flow rate has been found preferable, possibly because higher rates cause tumbling of the platelets in turbulent flow and their effective size in the flow field of the apparatus varies as the plate angle varies relative to the direction of flow. This feature clearly differentiates known uses of disc stack separators and their parameters of operation from the present invention since the small size of the platelets and their inter-atomic interactions and the 2D nature of the platelets makes their behaviour in a shear field unpredictable.

The preferred fluid is water. The fluid of the present invention is a liquid. The fluid for use in the present invention is a suspension of solid particles in a liquid. A suspension of between 10 g/L and 200 g/L of solids is preferred.

The ratio of the cone/disc outer diameter to the cone height is preferably in the range 0.95 to 1.05.

For the purposes of this description, laminar solid particles are particles of a material having a crystalline structure comprising atomically thin layers, which can be separated by exfoliation (or delamination) processes into atomically thin 2-dimensional materials. An atomically thin 2-dimensional material may be defined as a material having dimensions in a plane at least an order of magnitude (10×), preferably two orders of magnitude (100×) greater than the thickness of the particle, and the thickness of the particle being in the order of submicron thickness, preferably up to 100 nm in thickness, most preferably between one atomic layer thick and 30 layers thick.

The most well-known of these materials is graphite, which can be exfoliated into the two-dimensional material graphene. Hexagonal boron nitride is another material which has been successfully exfoliated into mono and few atomic layer structures.

Another suitable material is molybdenum disulphide. Molybdenum disulphide is a member of the group of transition metal dichalcogenides. Transition metal dichalcogenides (TMDC) are semiconductors of the type $MX_2$, with M a transition metal atom (Mo, W, etc.) and X a chalcogen atom (S, Se, or Te.). One layer of M atoms is sandwiched between two layers of X atoms. Many of the TMDC group of compounds form layered crystal structures, with separate layers bound together by weaker Van-der-Waals forces, allowing them to be exfoliated into monolayers.

Niobium diselenide, vanadium telluride, manganese oxide and molybdenum trioxide, are further materials which exhibit the ability to be exfoliated into few atomic layer platelets and can be separated in size using the present invention.

The present invention provides

A method of continuously separating a solid suspension containing submicron thickness laminar solid particles into a submicron thickness particle fraction suspension and a residual particle fraction suspension, the method comprising the steps of:
providing a continuous centrifuge apparatus;
providing a solid suspension of submicron thickness laminar solid particles in a solid suspension;
separating the solid suspension in the apparatus;
wherein the solid suspension comprises the submicron thickness laminar solid particles in a liquid continuous phase.

The present invention also provides a system for the continuous separation of delaminated submicron thickness particles from a suspension of laminar particles, the system comprising:
a continuous centrifuge apparatus;
wherein the suspension of laminar particles comprises a solid suspension comprising submicron thickness solid particles in a liquid continuous phase;
the system being configured to continuously feed the first solid suspension to the centrifuge which separates solid suspension into a suspension of submicron thickness laminar particles and a solid suspension residue.

The solid suspension may have been produced using delamination apparatus for exfoliation of the suspended solids, by feeding a precursor solid suspension comprising supra-micron solid suspension of a laminar material in a liquid continuous phase capable of being de-laminated into submicron thickness laminar solid particles;
where the delamination apparatus is configured to continuously receive the precursor solid suspension and partially delaminate the laminar material into submicron thickness particles comprising the first solid suspension and; configured to continuously feed the resulting solid suspension from the delamination apparatus to the centrifuge. The resulting solid suspension will contain some submicron thickness particles in suspension, where the submicron thickness particles are atomically thin 2-dimensional materials, i.e. having a thickness less than one micron, preferably less than 100 nm, most preferably between one atom thick up to 30 layers. These particles may be referred to as nano-platelets. A portion of the original material may have been incompletely delaminated, and will remain as supra-micron particles in suspension.

In some examples the delamination apparatus may be a high-pressure homogeniser, such as described in pending patent application GB1518105.0. The delamination apparatus may be a high shear rotor-stator mixer, a fixed geometry homogeniser or other known methods to exfoliate few-layer nano-platelets from laminar material. The method of use of the apparatus of the present invention is very preferably upon broad-spectrum particle size material such as produced by delamination using a high-pressure homogeniser. The method of use of the present invention gives a practical and industrial scale means to separate out atomically thin two-dimensional materials produced by such an apparatus.

Advantageously, the method or the system described may be used to continuously separate suspensions of partially delaminated graphite or hexagonal boron nitride.

Optionally, the method or system can be used to continuously separate suspensions of molybdenum disulphide, tungsten diselenide or other transition metal dichalcogenides. Transition metal dichalcogenides (TMDC) are semiconductors of the type $MX_2$, with M a transition metal atom (selected from Mo, W) and X a chalcogen atom (selected from S, Se, or Te). In these materials, it is understood that one layer of M atoms is sandwiched between two layers of X atoms.

Furthermore, it is envisaged that the method or the system may be used to continuously separate suspensions of layered silicates, perovskites, niobates, layered metal oxides, metal halides and transition metal tri- or di-chalcogenides, graphite, boron nitride, molybdenum disulphide, tungsten diselenide or other transition metal dichalcogenides, graphyne, borophene, germanene, silicene, stanene, phosphorene, graphane, germanane, $Bi_2Sr_2CaCu_2O_x$ or combinations thereof.

Preferably, the method or the system may be used in separating submicron thickness particles of graphite, boron nitride, molybdenum disulphide, molybdenum diselenide, molybdenum ditelluride, tungsten disulphide and tungsten diselenide. More preferably the present invention may be used for separating delaminated molybdenum disulphide, molybdenum diselenide, molybdenum ditelluride, tungsten disulphide and tungsten diselenide. Most preferably the present invention may be used to separate graphene platelets by size, most preferably graphene platelets as derived from graphite.

The invention provides a system and a method for continuously separating submicron thickness particles, preferably in the particle thickness range of 1 to 100 nm. The submicron particles are preferably atomically thin two-dimensional materials, such as platelets. For such materials, the particle size in the X and Y planes (i.e. as opposed to thickness in the Z plane) may be up to 10 microns.

Preferably each of the suspensions is a solid suspension comprising water as the continuous phase.

Preferably each of the suspensions is stabilised by means of a surfactant. More preferably the surfactant is sodium cholate.

Preferably the suspension is a suspension of graphite which has been partially delaminated into graphene.

In some embodiments, the continuous phase has a density greater than water but no more than the density of the suspended solid.

Preferably the continuous centrifuge apparatus is a disc stack centrifuge. A disc stack centrifuge is a type of centrifuge that enables continuous separation of particles from suspension. A continuous flow of solid suspension may be introduced into the centrifuge. A stack of inclined discs rotates with the suspension, increasing the surface settling area which speeds up the separation process. The denser sediments collect at the periphery of the separator and may be released either continuously or intermittently while the centrifuge continues to operate, allowing the sediments to be reprocessed while the supernatant is extracted through a different path.

A traditional, non-disc stack laboratory type centrifuge would cause sedimentation of the particles. The supernatant fluid would be extracted, and the sedimented particles would be removed from the centrifuge and then redispersed in a solvent, after which repeated centrifugation would again cause sedimentation of some of the nano-platelets. This process may need to be repeated until the desired separation is achieved. A disc stack centrifuge process may continuously redisperse and separate sedimented nano-platelets. For example, a phase enriched with mixed nano-platelets and graphite particles may be continuously circulated through the disc stack centrifuge, becoming more and more refined.

DETAILED DESCRIPTION OF THE INVENTION

Figure 1:
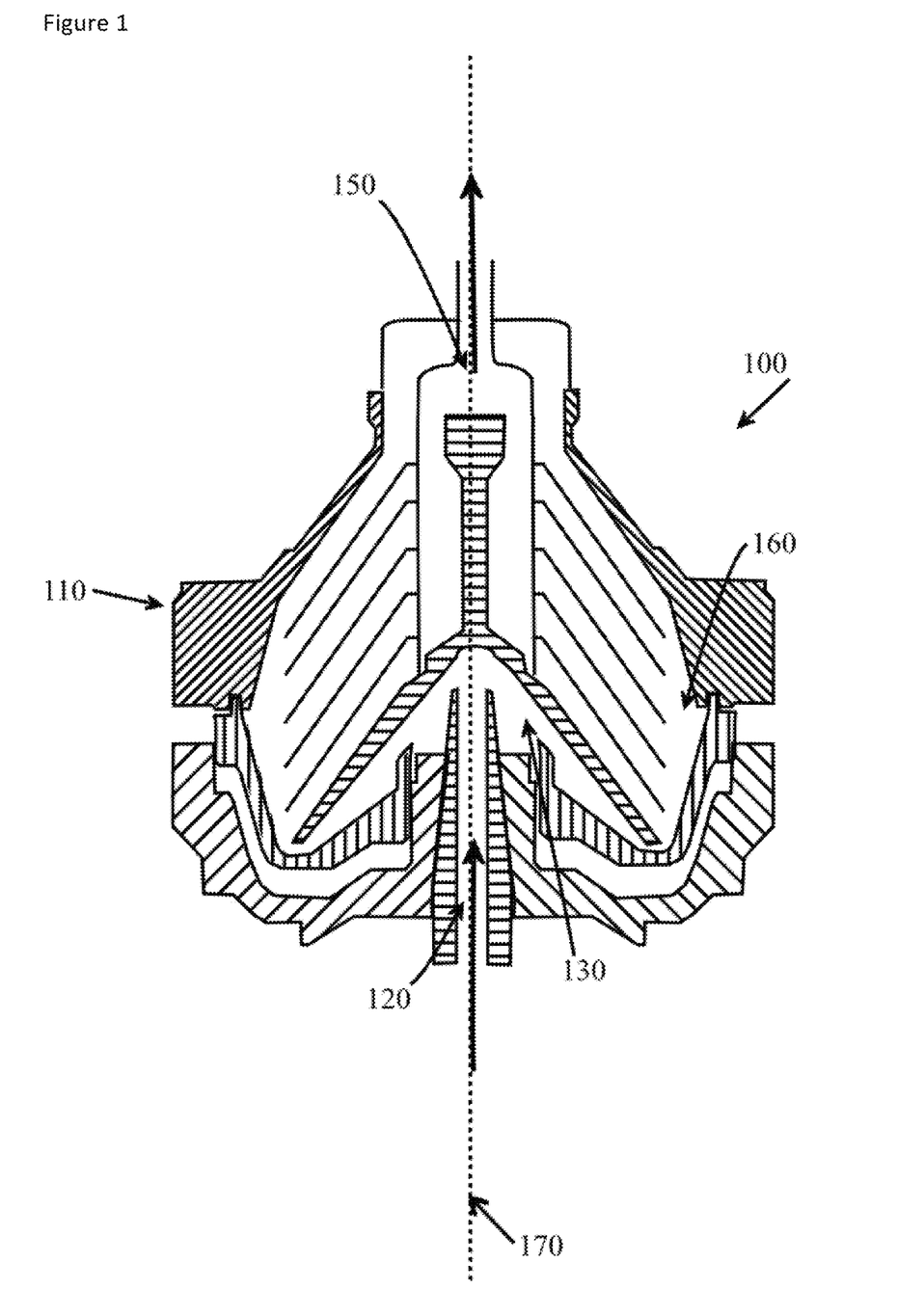
FIG. 1 shows a section through a typical disc stack centrifuge as used in the present invention.
Figure 2:
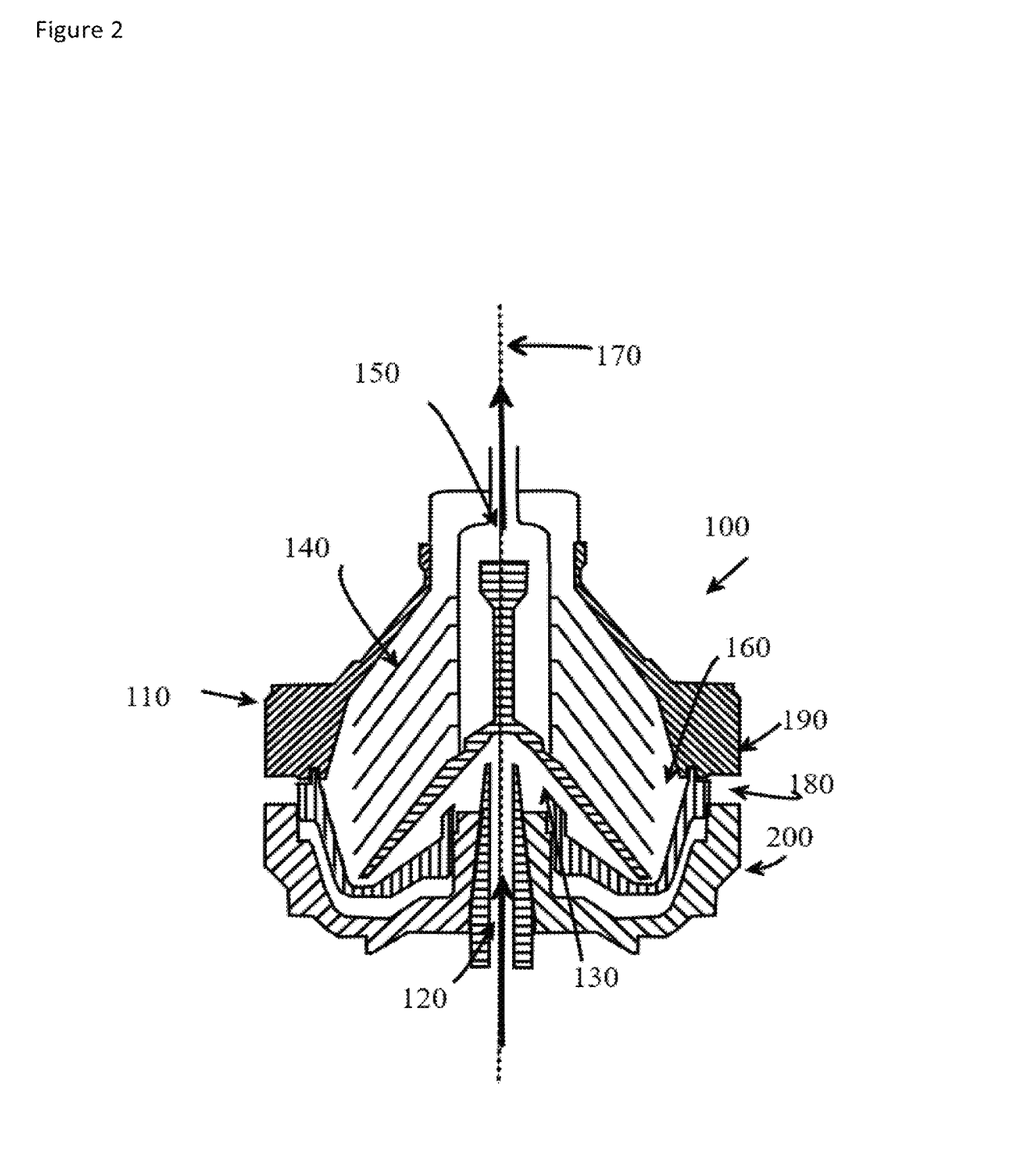
FIG. 2 shows a section through a typical disc stack centrifuge with the solids discharge gap open.

FIG. 1 and FIG. 2 show a cross section through a disc stack centrifuge (100). Separation takes place inside a rotating vessel (110). During operation, the vessel rotates about axis (170), generating centrifugal force in a radial direction. The suspension is introduced to the rotating centrifuge vessel (110) from the bottom via an inlet pipe (120), and is accelerated in the distributor (130), which may be configured to provide smooth acceleration of the input suspension. Leaving the distributor, the suspension enters the disc stack (140). The separation takes place between the discs, with the liquid continuous phase moving radially through the disc stack towards the centre. During this movement, the suspended solids that are denser than the liquid continuous phase are differentially accelerated outwards in the opposite direction to the liquid movement. When the liquid reaches the centre, it is discharged through the exit (150) where it is collected or may be recirculated for further centrifugation. The particles separated from the suspension move to the periphery (160).

These particles collect in the periphery where they may be discharged. The solid may be discharged by means of a gap (180) between the top (190) and bottom (200) of the rotating vessel at suitable pre-set intervals, the gap being opened by mechanical means for example a hydraulic system, or the gap can be set at a permanent suitable width to enable a continuous discharge of solids.

In the present invention, the disc stack centrifuge may be used to separate graphene nano-platelets according to their thickness or particle size. In some embodiments, the disc stack centrifuge can enable a sorting of the graphene nano-platelets according to the number of atomic layers present.

In the present invention, the disc stack centrifuge may be used to separate hexagonal boron nitride nano-platelets according to their thickness or particle size.

In the present invention, the disc stack centrifuge may be used to separate molybdenum disulphide nano-platelets according to their thickness or particle size.

Molybdenum diselenide, molybdenum ditelluride, tungsten disulphide, tungsten diselenide are further materials which have shown some success with the separation process described by the present invention.

For example, a disc stack centrifuge may be used to concentrate nano-platelets having at least one common characteristic (e.g., sheet resistance, Raman spectra, number of atomic layers).

The present invention may exclude graphene and hexagonal boron nitride.

With a 2-dimensional material such as graphene the rate of separation of particles depends on both the effective density and the size of each particle, and as the particles are not spherical the separation rate may also depend on the orientation of the platelets.

Figure 3:
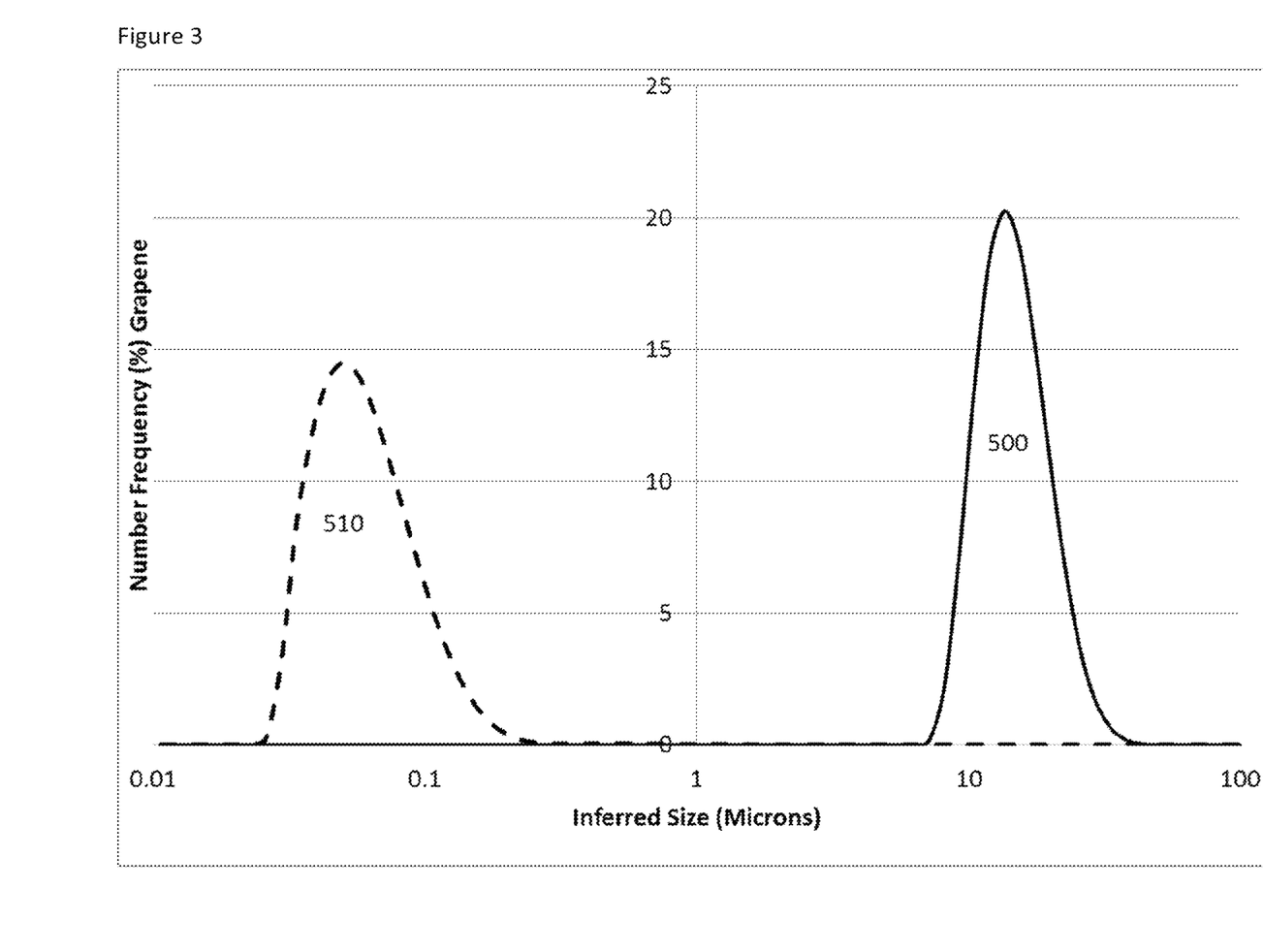
FIG. 3 shows a chart of particle size distribution of a graphene dispersion produced by the current invention.

FIG. 3 shows an example of the particle size distribution of a graphene suspension, before and after the use of the present invention. The particle size was measured using a Malvern Mastersizer™. The solid line (500) shows the range of particle sizes in the first suspension before the disc stack centrifuge process was carried out. The peak has a maximum at approximately 13.5 μm. The dashed line (510) shows the range of particle sizes in the suspension after the disc stack centrifuge process. The peak has a maximum at approximately 0.05 μm. This demonstrates that the disc stack centrifuge has surprisingly (?) separated the graphene nano-platelets very effectively compared with prior art techniques.

We have demonstrated that this technique using the equipment and configuration we have identified can separate nano-platelets that are particularly suitable for end uses such as conductive inks, in a continuous flow process that can process from 50 litres per hour to 4000 litres per hour of suspension, compared with prior art techniques that require many hours to process a few millilitres of suspension.

Figure 4:
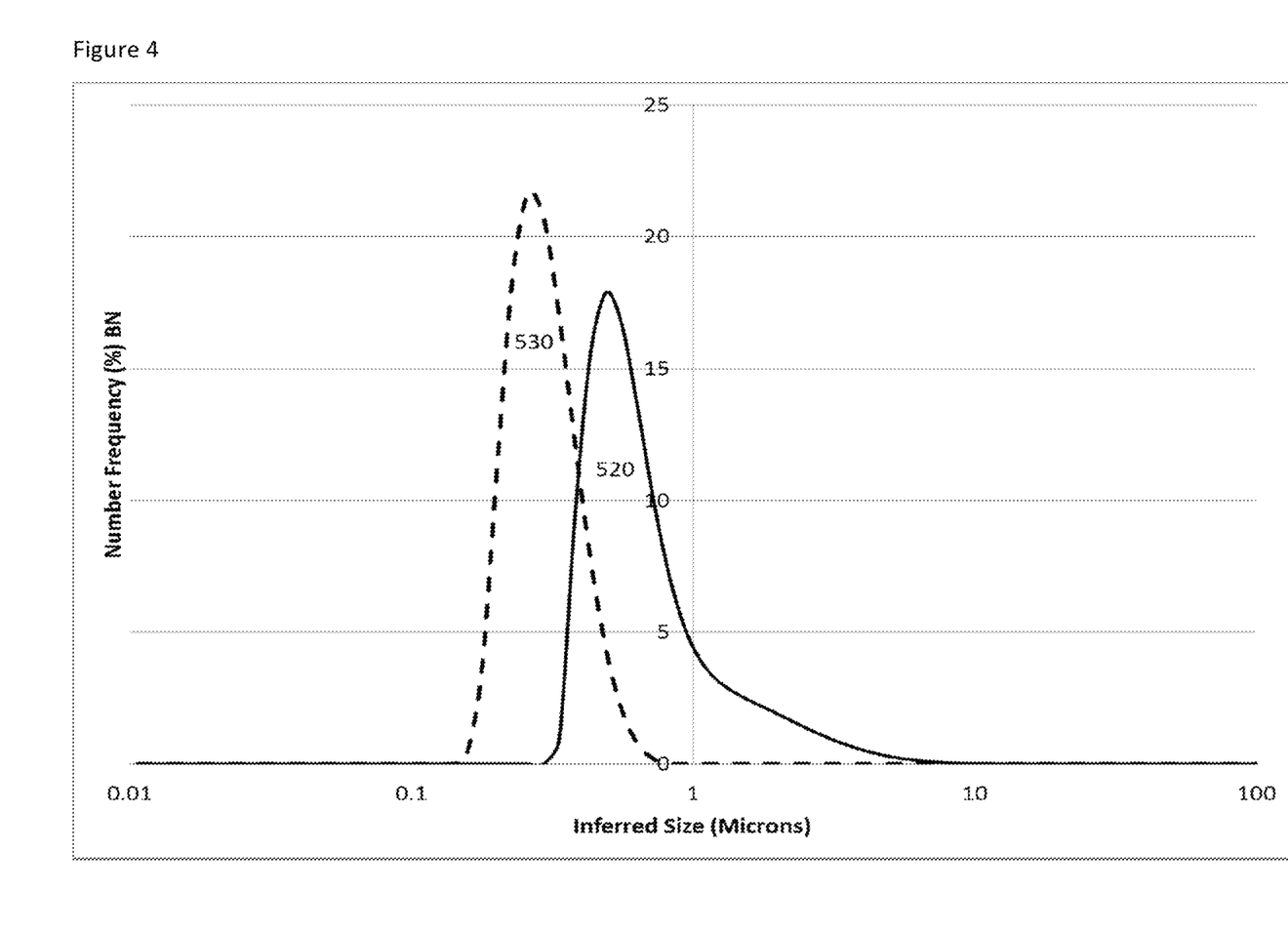
FIG. 4 shows a chart of particles size distribution of a boron nitride dispersion as produced by the current invention.

FIG. 4 shows an example of the particle size distribution of a boron nitride suspension before and after the use of the present invention. The solid line (520) shows the range of particle sizes in the first suspension before the disc stack centrifuge process was carried out. The peak has a maximum at approximately 0.5 μm. The dashed line (530) shows the range of particle sizes in the suspension after the disc stack centrifuge process. The peak has a maximum at approximately 0.26 μm. This demonstrates that the disc stack centrifuge has also separated the boron nitride nano-platelets very effectively.

Figure 5:
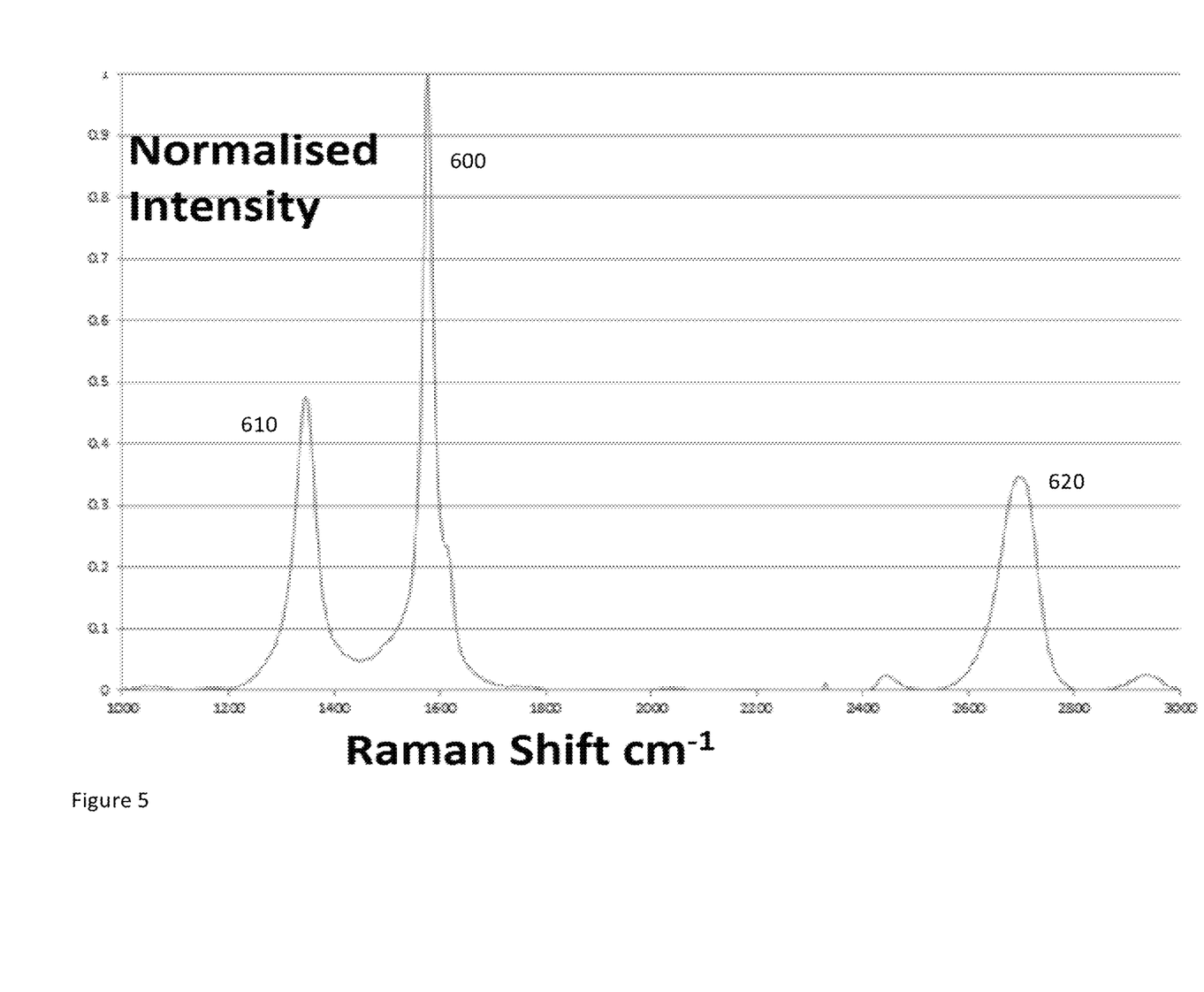
FIG. 5 shows the Raman spectra of a sampled of graphene produced by the current invention.

FIG. 5 shows an example of Raman spectroscopy of a sample of graphene nano-platelets prepared using the present invention. The G peak (600), the D peak (610) and the 2D peak (620) are used to indicate the number of defects and sheet thickness. In this case the ratio D/G=0.49 which is higher than some samples obtained using other methods, and is perhaps consistent with smaller flakes.

The symmetric shape of the 2D peak indicates that the sample has good quality in terms of percentage of monolayer graphene.

The sheet resistance of this sample was 8.26 Ohm/Sq, which is advantageously lower than many samples produced using prior art techniques.

Figure 6:
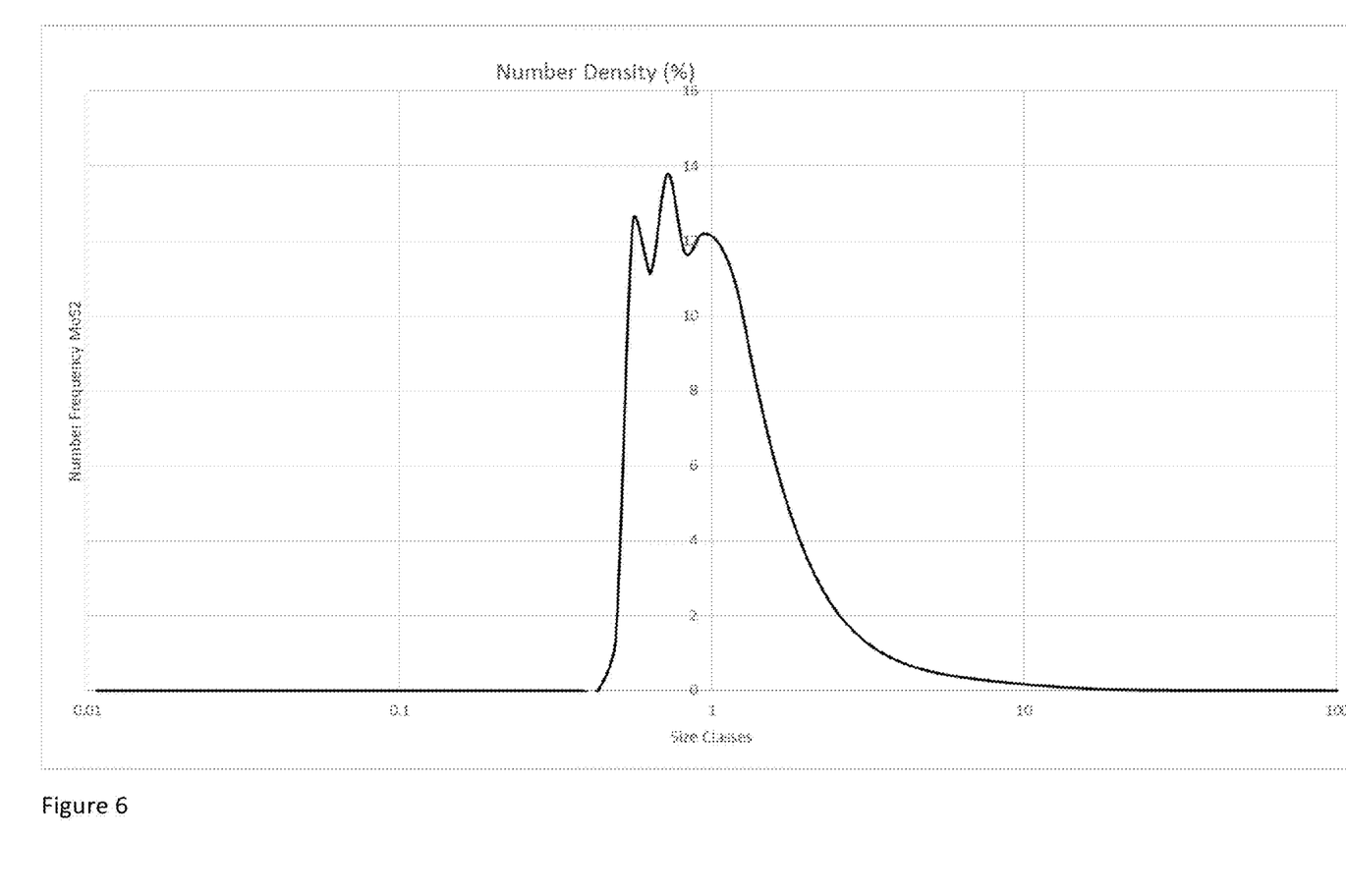
FIG. 6 shows a chart of the particle size distribution of a molybdenum disulphide suspension after the use of the method of the present invention.

FIG. 6 shows an example of the particle size distribution of a molybdenum disulphide suspension after the use of the method of the present invention. The solid line shows the range of particle sizes in the suspension after the disc stack centrifuge process. The peak has a maximum centered at approximately 0.72 μm. The material entering the disc stack separator (not shown) had a mean particle size of 100 μm. This demonstrates that the disc stack centrifuge has also separated the molybdenum disulphide nano-platelets very effectively into a sub-micron fraction.

Figure 7:
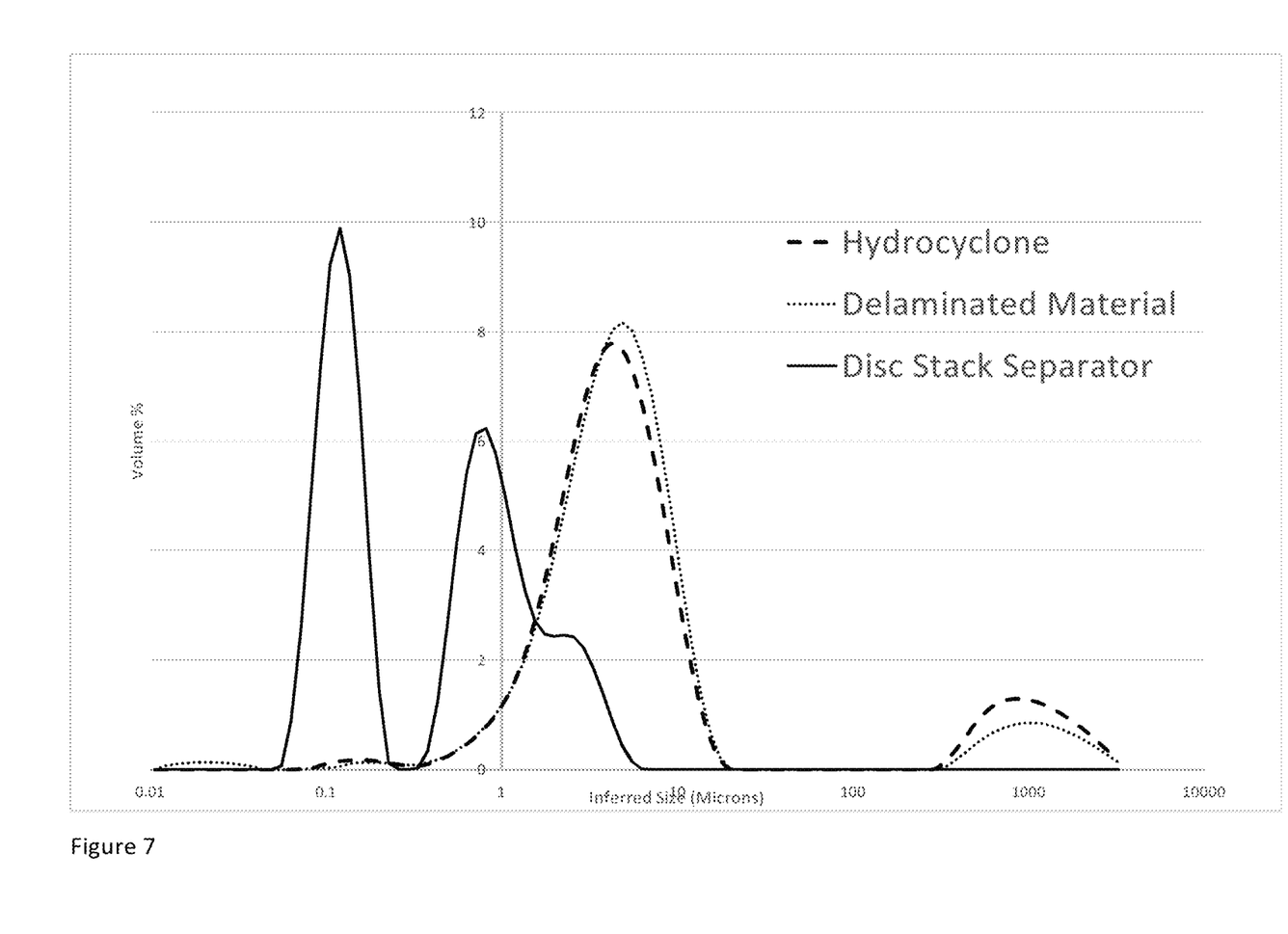
FIG. 7 shows a chart of particle size distribution of a graphene dispersion produced by the present invention compared with a dispersion produced by an alternative process.

FIG. 7 shows a chart of particle size distribution of a graphene dispersion produced by the present invention compared with a dispersion produced using a hydrocyclone. A hydrocyclone is another continuous separation process that is used to separate particles in suspension into two streams according to particle size and/or mass. The dotted trace on the chart shows the starting suspension which in this case is a graphene dispersion produced using a homogeniser. The peak particle size is around 7 microns. The dashed trace shows the suspension resulting from the overflow of a hydrocyclone, which has a similar distribution to the starting suspension. The solid line then shows the particle size distribution of the overflow from a disc stack separator, showing a clear reduction in peak particle size by volume, to around 0.1 micron.

The process of the invention allows the selection of desirable properties of the material, which may be classified in the following ways.

As an example, the nano-platelets may be classified by the lateral size of each platelet. A range of methods have been used to give an indication of the particle size distribution of the graphene nano-platelets. This ranges from Transmission Electron Microscope (TEM) analysis for an "idealised" system of discrete particles to a laser scattering testing and sieve analysis for powders and suspensions of nano-platelets that will be more indicative of the end product.

Lateral flake size may be measured by scanning or transmission electron microscopy. This technique comprises preparing a sampled of either the powder or a dispersion of the material, producing an electron microscope image, and then measuring the perpendicular length and width of the flakes.

TEM samples are drop-casted onto holey carbon grids and allowed to dry at 60° C. for 72 hours under vacuum. Bright field and energy filtered TEM micrographs are taken at random locations across the grids, to ensure a non-biased representation of the level of exfoliation.

The samples may be characterised using low resolution TEM. The aim of this is twofold: to assess the nature and quality of the exfoliated flakes; and in some cases, to measure the lateral flake dimensions. Samples are prepared by drop-casting and imaging the grids on a Jeol 2100™ TEM operating with an LaB6 electron gun at 200 kV.

The thickness of samples prepared in the same way can also be measured using atomic force microscopy (AFM). This technique can both provide estimates of lateral size as well as thickness of nano-platelets.

In practice electron microscope techniques are quite time-consuming to perform. Therefore, a quicker method of size classification is used during testing and production, which is compared to the electron microscope imagery for calibration.

Samples of the products have been analysed using a Malvern Mastersizer 3000™. This uses the technique of laser diffraction to measure the size of particles, by measuring the intensity of light scattered as a laser beam passes through a dispersed particulate sample. This data is then analysed to calculate the size of the particles that created the scattering pattern. The Malvern Mastersizer™ settings were "non-spherical particle mode", using red and blue light, and water as the medium. A stirrer was fitted to ensure the samples were uniform.

Sieve testing has been used to give an indicative size distribution by weight, which is analogous to the measurements obtained at the Malvern Mastersizer™ by volume. The results are in a similar range to that obtained in the Malvern Mastersizer™ which gives an independent cross check of the latter's measurements.

Two sieve sizes are used, a 150 μm and a 38 μm hole size. The sieves are weighed and stacked and then placed on the sieve shaker. 5.29 g of powder produced by drying the product of the present invention is added in the top. An initial time of 5 minutes is used at full shaker capacity (3 mm/g). The material is then weighed and the sieves are reassembled with the material still in the sieves. The sieves are then put back on the shaker for another 5 minutes.

Raman spectroscopy is used to classify the quality of the platelets. In the case of graphene, the G peak, the D peak and the 2D peak are used to indicate the number of defects and sheet thickness. The ratio of intensity of D/G bands is a measure of the defects present on graphene structure. The G band is a result of in-plane vibrations of SP2 bonded carbon atoms whereas the D band is due to out of plane vibrations attributed to the presence of structural defects. All platelets have edges, which are defects in the crystal structure and so the D band is never zero as it would be in a perfect, infinite plane. If there are some randomly distributed impurities or surface charges in the graphene, the G-peak can split into two peaks, G-peak (1583 cm-1) and D'-peak (1620 cm-1). The main reason is that the localized vibrational modes of the impurities can interact with the extended phonon modes of graphene resulting in the observed splitting. The D peak usually appears around 1350 cm-1 and the G peak usually appears around 1570 cm-1. The 2D peak sometimes labelled as G' corresponds to the same vibrations as the D band, but can be used to assess the number of atomic layers in a sample. Combination peaks D+D' and D+D" may appear around 2460 $cm^{-1}$ and 2930 $cm^{-1}$.

The Raman spectra is measured using a Horiba XploRA™ Raman Microscope. Samples are supplied as a thin film on a filter membrane. After baseline removal, the peaks D, G, D', D+D' and 2D are manually identified using the manufacturer's analysis software. The D/G ratio is calculated by dividing the peak intensity of the D peak by the peak intensity of the G peak. At least five spectra are analysed for each sample, and the D/G and D/D' ratio is calculated for each, which are then averaged.

In the present analysis, the interpretation of the 2D peak is not as straightforward as in pure graphene. Due to a large number of flakes in each sample, each flake gives a 2D band, the intensity and shape of which is dependent on the number of layers and stacking of those layers. In single layer graphene, the 2D peak is a single peak with a 2D/G ratio around 4, whereas for bilayer graphene the peak splits and the intensity reduces. The peak changes shape with each additional layer.

Without wishing to be bound by theory, when Raman spectroscopy is carried out on a sample of nano-platelets with many overlapping flakes a straightforward characterization is not possible. In general, the 2D peak is less clearly defined than for single layer graphene, but a well-rounded peak is indicative of more single layer graphene in the sample than the uneven peaks caused by multilayer samples.

An important parameter is the sheet resistance, measured in ohms/square. The measurement using a four-point probe is carried out on a sample of the product applied to a substrate, such as a graphene film on a nylon membrane.

The sample is weighed, and measurement is taken according to instructions from the manufacturer of the four-point probe. In this case, we used a Jandel™ RM3000 set to 10 mA measuring current. Six measurements are taken at different positions of each sample and an average taken. The measurement is normalized based on the measured weight to an equivalent 30 mg sample.

For both Raman and Sheet resistance measurements, the samples were prepared by the following steps:

Obtain a dispersion with nominal concentration of 100 g/L.

Obtain Nylon 66 membrane and plastic petri dish for storage.

Weigh nylon membrane in precision scales and note weight on petri dish.

Obtain vacuum pump and place in fume cupboard.

Place weighed membrane on glass filter ensuring the centre point of the membrane is aligned with the centre point of the glass filter.

Wet the membrane with a few ml of de-ionised water until membrane is soaked with water.

Place glass funnel on glass filter and clamp in place with metal clamp

Turn on vacuum pump, until nylon membrane rests firmly and uniformly on glass filter and all water is filtered through the membrane.

Using a micro-pipette measure 0.3 ml of graphene dispersion in a volumetric cylinder and top up dispersion with de-ionised water up to a total volume of approximately 20 ml.

Turn vacuum pump on and pour dispersion in glass funnel.

When all water is filtered through pour 20 ml of de-ionised water in funnel and allow this to filter through.

Turn off vacuum pump.

Remove clasp and glass funnel.

Remove membrane from glass filter.

Place membrane on petri dish

Place petri dish in oven for at least 2 hours at 50° C.

An indication of the surface area of the product may be obtained by the BET (Brunauer-Emmett-Teller) gas adsorption method, supported by the electron microscopy described above. Surface areas of the samples are analysed by N2 physisorption at the liquid nitrogen temperature using a Micromeritics™ ASAP® 2020 instrument. Before the analysis, the samples are de-gassed at 200° C. for 12 hours at a pressure lower than $10^{-3}$ mmHg. The surface area of the samples is then calculated applying the BET equation to the collected data. The eventual presence of micropores is assessed by t-plot analysis. The pore size distributions and cumulative pore volumes for both adsorption and desorption branches are calculated following the BJH (Barrett-Joyner-Halenda) method. All the calculations are performed following the IUPAC recommendations.

In one example, using graphite particles delaminated into graphene, the measurements before and after separation were taken using the techniques described above and produced the following results:

| Sample L5443 | Before separation | After separation |
| --- | --- | --- |
| Sheet resistance Ω/Sq. | 11.7 | 5.9 |
| Raman D/G | 0.08 | 0.22 |
| Modal particle size. | 4.8 micron | 0.12 micron |

Factors which may be controlled in the process to select the quality of graphene produced are as follows.

The loading of solid material in the liquid phase, which affects the viscosity of the suspension, and the productivity of delamination process prior to the separation. Although the separation process may be modelled as a Stokes settlement process, it is in fact far more complex as a suspension of mixed particles and platelets with a wide variation in size will not behave like a uniform suspension of spheres.

The solid content is preferably between 1% and 20% by weight, more preferably between 1% and 10% by weight.

The range of particle size in the input suspension ranges from 0.01 µm to 100 µm as measured by particle size distribution analysis.

The range of thickness of the particles in the input suspension is between 0.2 nm and 100 µm, preferably less than 100 nm, most preferably in the range one atom thick up to 30 layers thick.

The temperature of the suspension may affect the viscosity. An advantageous effect is that while it is known that the viscosity of water reduces with increasing temperature, the bulk viscosity of a graphene suspension has been discovered to increase with temperature. This enables the separation of graphene from a mixed suspension to be fine-tuned by careful selection of the operating temperature during the centrifugation stage in order to optimise the viscosity ratio between the sediment and the supernatant. Advantageously we have found the most efficient separation rate to take place at a temperature of between 5° C. and 50° C., for example between 20° C. and 40° C. preferably at 35° C.

The viscosity of the continuous phase may be between 0.0001 Pa·s and 10 Pa·s. Preferably the viscosity is between 0.0001 Pa·s and 0.1 Pa·s. Most preferably the viscosity is between 0.0004 Pa·s and 0.001 Pa·s.

A surfactant may be added to the suspension which will also vary the viscosity and the stability of the suspension. The preferred surfactant is sodium cholate.

The density of the continuous liquid phase may be varied to improve the degree of separation, although this will reduce the speed of separation.

In the case of nano-platelets, the effective density of the surfactant coated platelet in suspension varies with the number of layers in the platelet. For example, monolayer graphene in sodium cholate has an effective density around 1.16 g/cc.

The density of the input suspension may be between 0.3 g/cc and 5 g/cc, preferably between 1 g/cc and 1.5 g/cc.

The density of the continuous phase liquid used in the suspension may be between 0.3 g/cc and 1.5 g/cc, preferably between 0.9 and 1.4 g/cc, most preferably 1.1 g/cc.

By selecting the appropriate combination of these factors, the disc stack separator can be used in combination with an exfoliation process to select the desired properties of the nano-platelets in a continuous process, enabling efficient industrial scale production.

Measured Effectiveness of Separation.

| Material | Average Particle size (D4, 3) before separation (µm) | Average Particle size (D4, 3) after separation (µm) |
| --- | --- | --- |
| Graphite/Graphene | 13.5 | 0.05 |
| Hexagonal Boron Nitride | 0.5 | 0.26 |
| Molybdenum disulphide | between 15 and 100 | 0.72 |
| Molybdenum diselenide | 15 | 0.8 |
| Molybdenum ditelluride | 50 | Sub-micron |
| Tungsten disulphide | 20 | 0.8 |
| Tungsten diselenide | 25 | Sub-micron |

The last four sets of figures are subject to error due to small sample size.

Other materials considered suitable for use in the present invention are niobium diselenide, vanadium telluride, manganese oxide and molybdenum trioxide.

These sizes are as given by a Malvern Mastersizer™ using the standard settings. These are indicative of the dimensions of the nano-platelets, using the sphere equivalent diameter. As we are operating on the limit of the operating range, using non-spherical samples, these figures present evidence of the successful size separation by the continuous centrifuge, but are not indicative of the actual flake dimensions. However, the flake dimensions have been verified to be in a similar range using electron microscopy and other methods described above.

The results and conditions in this document are taken at 25° C. unless mentioned otherwise.

The invention claimed is:

1. A method of continuously separating a solid suspension containing submicron thickness laminar solid particles into a submicron thickness particle fraction suspension and a residual particle fraction suspension, the method comprising:

providing a continuous centrifuge apparatus that comprises a disc stack centrifuge that comprises a disc angle, relative to an axis of rotation, within a range from 30° to 50°, a disc separation within a range from 1 mm to 20 mm, and a number of discs within a range from 10 to 100;

providing the solid suspension; and separating the solid suspension in the continuous centrifuge apparatus into the submicron thickness particle fraction suspension and the residual particle fraction suspension;

wherein the submicron thickness laminar solid particles comprise particles of partially delaminated graphite, hexagonal boron nitride, molybdenum disulphide, molybdenum diselenide, molybdenum ditelluride, tungsten disulphide, tungsten diselenide or other transition metal dichalcogenides.

2. The method of claim 1, wherein the submicron thickness laminar solid particles comprise particles of a material having a crystalline structure comprising atomically thin layers, which have been partially delaminated into atomically thin nano-platelets.

3. The method of claim 1 wherein the submicron thickness laminar particles are in a particle size range of 1 nm to 100 nm.

4. The method of claim 1, wherein the suspension is in water, wherein the water forms a continuous phase.

* * * * *